(12) United States Patent
Srivastava et al.

(10) Patent No.: US 11,294,846 B2
(45) Date of Patent: Apr. 5, 2022

(54) SYSTEM, APPARATUS AND METHOD FOR SECURE COMMUNICATION ON A BUS

(71) Applicant: Intel Corporation, Santa Clara, CA (US)

(72) Inventors: Amit Kumar Srivastava, Folsom, CA (US); Kenneth P. Foust, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 985 days.

(21) Appl. No.: 15/706,913

(22) Filed: Sep. 18, 2017

(65) Prior Publication Data

US 2019/0087377 A1 Mar. 21, 2019

(51) Int. Cl.
*G06F 13/42* (2006.01)
*G06F 13/40* (2006.01)
*G06F 21/85* (2013.01)
*G06F 21/62* (2013.01)

(52) U.S. Cl.
CPC .......... *G06F 13/42* (2013.01); *G06F 13/4063* (2013.01); *G06F 21/62* (2013.01); *G06F 21/85* (2013.01); *G06F 2211/002* (2013.01); *G06F 2211/007* (2013.01)

(58) Field of Classification Search
CPC ...... G06F 13/00; G06F 13/42; G06F 13/4063; G06F 21/62; G06F 2211/002; G06F 2211/007
See application file for complete search history.

(56) References Cited

U.S. PATENT DOCUMENTS

| 2010/0169523 | A1 | 7/2010 | Dunstan et al. |
| 2013/0335151 | A1 | 12/2013 | Schrom et al. |
| 2014/0016679 | A1 | 1/2014 | Kesling et al. |
| 2014/0229644 | A1 | 8/2014 | Thanigasalam et al. |
| 2015/0381348 | A1* | 12/2015 | Takenaka ............ H04L 9/008 380/30 |
| 2017/0034284 | A1 | 2/2017 | Smith et al. |
| 2018/0159835 | A1* | 6/2018 | Iida .................. G07C 9/00174 |
| 2020/0117632 | A1* | 4/2020 | Mutter ................ G06F 13/409 |

OTHER PUBLICATIONS

Chris Vuotto, Vulnerabilities in Security Configuration on your Machines should be remediated, Dec. 2, 2021.*
U.S. Appl. No. 15/237,928, filed Aug. 16, 2016, entitled "Method, Apparatus and System for Role Transfer Functionality for a Bus Master," by Amit Kumar Srivastava, et al.
U.S. Appl. No. 15/366,001, filed Dec. 1, 2016, entitled "Method, Apparatus and System for Dynamic Clock Frequency Control on a Bus," by Duane G. Quiet, et al.

(Continued)

*Primary Examiner* — Henry Tsai
*Assistant Examiner* — Kim T Huynh
(74) *Attorney, Agent, or Firm* — Trop, Pruner & Hu, P.C.

(57) ABSTRACT

In one embodiment, an apparatus includes: a processing circuit to execute instructions; and a host controller coupled to the processing circuit to perform a key exchange with a second device to couple to the apparatus via a bus to which a plurality of devices may be coupled, and in response to a successful completion of the key exchange, enable secure communication with the second device. Other embodiments are described and claimed.

20 Claims, 8 Drawing Sheets

(56) References Cited

OTHER PUBLICATIONS

U.S. Appl. No. 15/198,027, filed Jun. 30, 2016, entitled "Method, Apparatus and System for Dynamic Optimization of Signal Integrity on a Bus," by Duane G. Quiet.
MIPI Alliance, "Specification Brief, Audio & Control: SLIMbus®, SoundWireSM," Oct. 7, 2014, 1 page.
U.S. Appl. No. 15/627,735, filed Jun. 20, 2017, entitled "System, Apparatus and Method for Extended Communication Modes for a Multi-Drop Interconnect," by Amit Kumar Srivastava.
U.S. Appl. No. 15/635,299, filed Jun. 28, 2017, entitled "Method, Apparatus and System for Dynamic Control of Clock Signaling on a Bus," by Kenneth P. Foust, et al.
U.S. Appl. No. 15/627,749, filed Jun. 20, 2017, entitled "System, Apparatus and Method for Tunneling and/or Multiplexing Via a Multi-Drop Interconnect," by Amit Kumar Srivastava.

\* cited by examiner

SYSTEM, APPARATUS AND METHOD FOR SECURE COMMUNICATION ON A BUS

TECHNICAL FIELD

Embodiments relate to communication of information on bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the Mobile Industry Processor Interface (MIPI) Alliance™ (www.mipi.org). This interface is expected to be used to connect devices, such as internal or external sensors or so forth, to a host processor, applications processor or standalone device via a host controller or input/output controller. This multi-drop bus provides for single-ended bi-directional data communication with a single-ended clock signal. The ability to dynamically join devices to this bus raises security concerns, as unauthorized agents may gain access to the bus.

DETAILED DESCRIPTION

In various embodiments, techniques are provided to enable secure communications to occur between devices coupled to a multi-drop bus. More specifically, such devices may undergo a secure key exchange protocol, in response to a request for at least certain types of communication. By way of this request, and to prevent one or more non-trusted devices that have access to the bus from improperly accessing secure bus communications, an identity of a link partner on the bus can be confirmed. That is, via this key exchange protocol, a master device may confirm that an agent coupled to the bus (e.g., a given device, e.g., internal or external to a particular platform) is trusted. In response to this determination, a secure communication may occur in a manner that prevents the communication from being snooped by one or more untrusted devices.

It is anticipated that a multi-drop bus may support various techniques such as secondary master (hub) operation, peer-to-peer communication, debug devices, and a hot join capability similar to a hot plug where devices (both internal and external to a given platform) can be connected after power up. Security issues may arise without an embodiment since externally connected devices like debug interfaces, secondary masters and peer devices are considered as non-trusted devices. Such devices may harm security by improperly controlling the bus, stealing secure sensing information, hanging the bus or refusing to give control back to the main master. With debug, display touch sensor data or another guest protocol sideband interface communicating over this bus, there are many more ways and places for a hacker to attack and steal sensitive information, without an embodiment.

Embodiments provide protection against security threats and also provide a secure communication flow for a multi-drop bus topology, to enable secure information to be exchanged only for trusted devices. Further, embodiments may simplify host/master communication, by providing a single methodology to authenticate a device regardless of the guest protocol that is used for the bus.

A secure key exchange protocol and secure communication as described herein can be used in many different communication contexts. For example, embodiments may be used between master/secondary master and external devices, e.g., during a hot join, master role transfer, peer-to-peer communication and guest protocols using the bus as a sideband interface. In these situations, a main master can authenticate the secondary master/external devices based on a given security policy, and thereafter possibly allow a role transfer to a secondary master to operate as a current master based on the security policy, or to perform a dynamic address assignment with devices that are secured.

Figure 1:
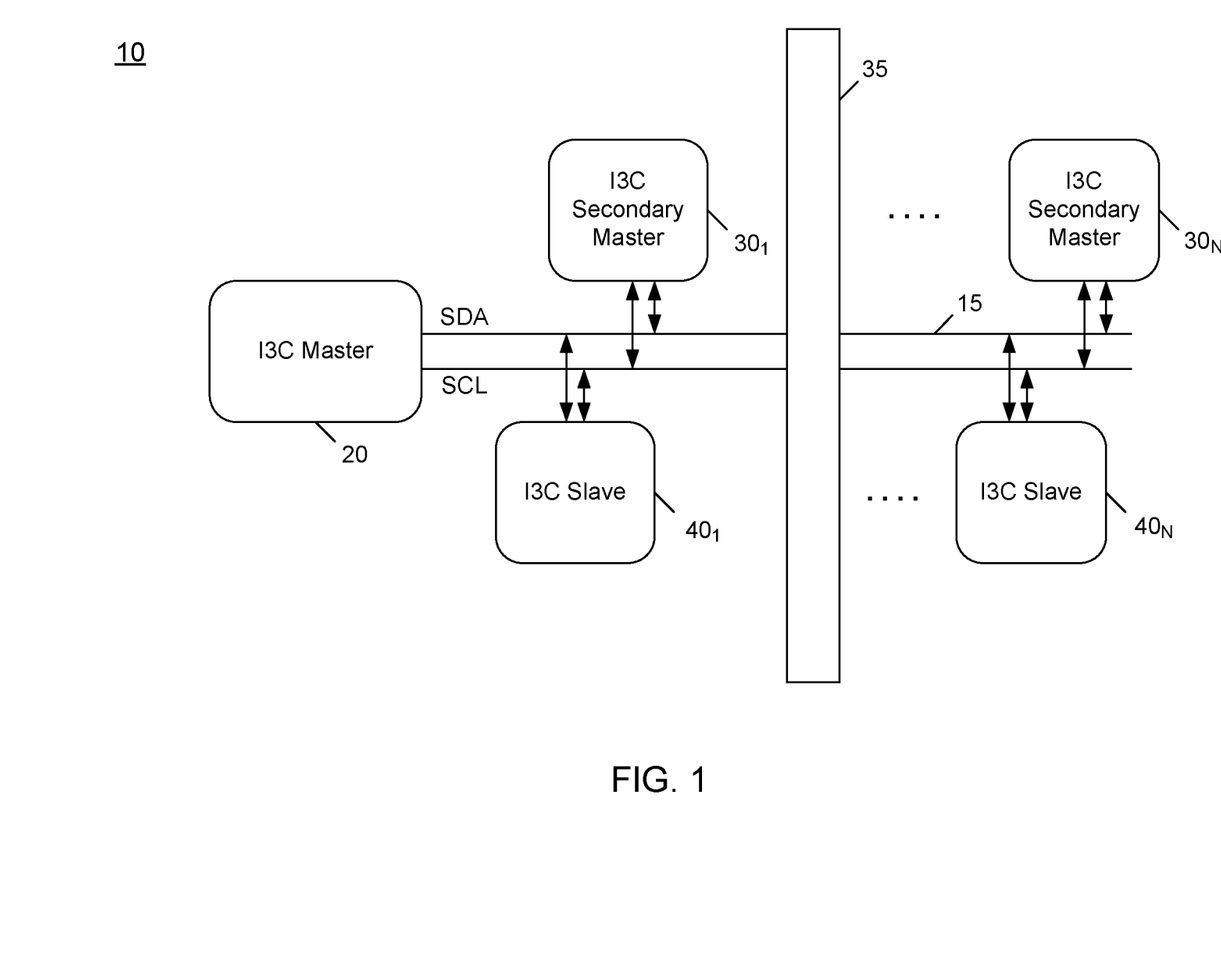
FIG. 1 is a block diagram of a system in accordance with an embodiment of the present invention.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15. In embodiments herein, bus 15 may be implemented as an I3C bus in accordance with the I3C Specification. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware circuitry to act as a bus master for bus 15. Master device 20 may include a controller (not shown in the high level view of FIG. 1) to control data (SDA) and clock (SCL) lines, as well as use (e.g.,) internal current sources or passive pullups to hold bus 15 when all coupled devices are powered off. In some cases, master device 20 may be a relatively simple host controller for a low complexity bus or other multi-drop bus, such as in accordance with an I²C or I3C Specification.

Other multi-drop interfaces such as Serial Peripheral Interface and/or Microwire also may be present in a particular embodiment.

In different implementations, master device 20 may be an interface circuit of a multicore processor or other system on chip (SoC), application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as a dedicated hardware circuit, e.g., a programmable logic, to perform bus master activities for bus 15.

Note that bus 15 is implemented as a two-wire bus in which a single serial line forms a data interconnect and another single serial line forms a clock interconnect. As such, data communications can occur, e.g., in bi-directional manner and clock communication can occur in a single direction. Master device 20 may be a relatively compute complex device (as compared to other devices on bus 15) that consumes higher power than other devices coupled to bus 15.

As shown in FIG. 1, multiple secondary master devices $30_1$-$30_N$ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20).

As further illustrated in FIG. 1, a plurality of slave devices $40_1$-$40_N$ also couple to bus 15. In different embodiments, slave devices 40 (generically) may take many different forms. As examples, one or more slave devices 40 may be a given type of sensor, such as an accelerometer or other sensor which may be incorporated in a given system (such as a smartphone or other mobile platform). For purposes of discussion herein, it may be assumed that slave devices 40 may be always on (AON) devices, such as sensors like micro-electrical mechanical systems (MEMS), imaging sensors, peer-to-peer devices, debug devices or so forth. For purposes of discussion herein, assume devices 30, 40 operate as slaves to master device 20. One or more devices 30, 40 may be powered when they are to be active, such as a type of sensor, e.g., a camera device that is powered on only when a camera functionality of the system is active. Other devices 30, 40 may be powered when coupled to bus 15. In one case, a device may be a slave device that can be physically added/removed via a hot plug or hot unplug operation, such as a cable, card or external peripheral device that is coupled to bus 15, e.g., by a cable, external connection or so forth.

More specifically as shown in FIG. 1, bus 15 is implemented such that devices both internal and external to a given device can couple to bus 15. As one example, where system 10 is a computing platform, a connector 35 is provided that enables external devices $30_N$, $40_N$ to couple to bus 15, e.g., by way of dynamic hot join. Such dynamic join may occur when such device is connected via connector 35, which may take the form of a plug, adaptor or so forth. Note that these and other external devices 30, 40 may be connected through connector 35 or connected through an external cable. In some cases, devices 30, 40 may communicate according to a guest protocol like Camera Serial Interface 2 or a touch display protocol. In cases in which bus 15 is used as a sideband interface, in-band data of the guest protocol may be sent via a different bus. In other cases, bus 15 may be used as a separate lane in conjunction with such other bus. Although not shown in FIG. 1, in some cases virtual input/output (I/O) devices and debug mechanisms may communicate via bus 15.

As such, in system 10, security issues may be raised by inclusion or dynamic adding of an unauthorized device that, without an embodiment, may be provided with unfettered access to communications on bus 15. Accordingly, in embodiments described herein a key exchange protocol can be performed prior to secure communications on bus 15 to ensure that a given device is authorized to access bus 15 and participate in communications thereon.

Note that requirements for performing a key exchange process prior to secure communication between devices can vary in a particular system, depending upon context of the device with which communication is to occur. For example, in situations where bus 15 is at least partially implemented within a single integrated circuit (such as a SoC or other multicore processor), communications via bus 15 with such internal components may occur without first performing a key exchange protocol as described herein. Instead, for other devices, which may be affixed within a particular system including bus 15, it is possible for a single key exchange process to be performed, e.g., per boot or reset of the device. Thereafter, secure communications may occur between such devices without further key exchanges. Instead, for still other devices that may dynamically join to bus 15 via an external connection (and thus represent a greater potential for unauthorized access), it is possible to perform the key exchange process prior to each secure communication. In such case, these external devices may be electrically and/or logically de-coupled between communication instances. Understand while shown at this high level in the embodiment of FIG. 1, many variations and alternatives are possible.

Figure 2:
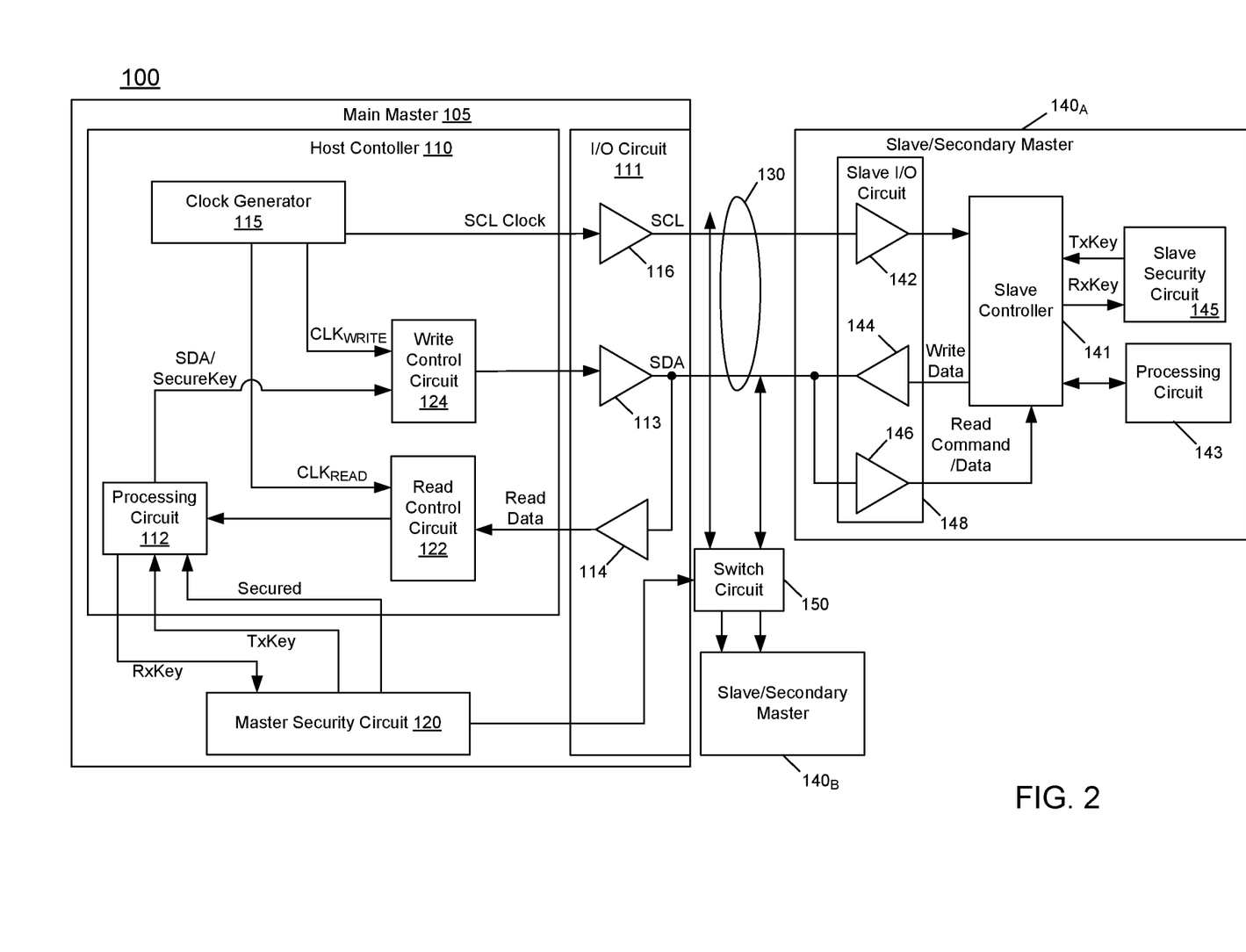
FIG. 2 is a block diagram of a system in accordance with another embodiment of the present invention.

Referring now to FIG. 2, shown is a block diagram of another system in accordance with an embodiment of the present invention. As shown in FIG. 2, a portion of a system 100 includes a main master 105 including a host controller 110 coupled to a plurality of devices $140_A$-$140_B$ via a multi-drop bus 130. As further illustrated, main master 105 includes an input/output (I/O) circuit 111. Devices 140 (also referred to herein as "slaves") may have different operational characteristics and also may have different capabilities of being added/removed from bus 130. As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in bi-directional manner and clock communications can occur in a uni-directional manner.

As illustrated in FIG. 2, master device 105 includes host controller 110 having a processing circuit 112. Understand that many different types of host controllers can be provided. As examples, host controller 110 may be an interface circuit of a multicore processor or other system on chip (SoC), application processor or so forth. In other cases, host controller 110 may be a standalone host controller for bus 130. And of course other implementations are possible. In different implementations, processing circuit 112 may represent one or more cores or other hardware processing logic of a particular device or it may simply be part of an interface circuit to act as transmitter and receiver for host controller 110. That is, while processing circuit 112 is shown as being internal to host controller 110, in situations where processing circuit 112 represents one or more cores of main master 105, such cores may be physically external to host controller 110. In turn, processing circuit 112 couples via a write control circuit 124 to a driver 113 that drives data onto bus 130 via a data line of bus 130, and via a read control circuit 122 to a receiver 114 that receives incoming data via the data line of bus 130. Host controller 110 further includes a clock generator 115 to generate a variety of different clock signals both for internal use and for communication on bus 130, including to send a clock signal to a clock line of bus 130 via corresponding driver 116.

As further shown, main master 105 includes a master security circuit 120. Although the scope of the present invention is not limited in this regard, master security circuit 120 may be implemented as a dedicated hardware circuit such as a separate security coprocessor, security engine or other programmable control circuit. As one particular embodiment, master security circuit 120 may be implemented as a converged security manageability engine (CSME) that is a separate programmable hardware execution circuit of a SoC or other multicore processor. In yet other embodiments, master security circuit 120 may be implemented as all or part of a trusted execution environment and/or protected environment, which may remain hidden from a main operating system and other hardware of main master 105 (with the exception of processing circuit 112). In still further cases, master security circuit 120 may be implemented as firmware and/or software that executes on one or more processing cores or other processing engines of main master 105.

In any event, master security circuit 120 is configured to perform a secure key exchange as described herein. More specifically, for a key exchange that is initiated by main master 105 under control of host controller 110, master security circuit 120 may generate a secure key. One embodiment for generating the secure key is described further below. Understand that this secure key can be maintained as a private key, stored in a protected portion of a memory, e.g., a memory enclave that is accessible only to master security circuit 120. Furthermore, master security circuit 120 may encrypt this key to provide an encrypted secure key to a link partner (e.g., device $140_A$) with which main master 105 is performing a key exchange process.

To this end as shown in FIG. 2, master security circuit 120 sends this secure key as a transmit (Tx) key message to host controller 110. In turn, host controller 110 may generate a packet communication that includes this secure key, for transmission to a given one of slave/secondary masters $140_A$, $_B$. As seen, this secure key may be sent by way of IO circuit 111 via the data line of bus 130.

Certain details regarding representative device $140_A$ also are shown in FIG. 2. Specifically, device $140_A$ includes a processing circuit 143, which may generate data to be written to main master 105, via communication with a slave controller 141, in turn coupled to a driver 144 of a slave I/O circuit 148 coupled to the data line of bus 130. In addition, incoming information may be received via a receiver 146 and provided to processing circuit 143 via slave controller 141. In the context of a secure key exchange, a data packet including the secure key is received by slave I/O circuit 148, which provides the packet to slave controller 141 that in turn may de-packetize the packet to obtain the secure key included therein. Note that slave I/O circuit 148 further includes a receiver 142 to receive a clock signal from main master 105. In turn, slave controller 141 provides this key as a receive (Rx) key to a slave security circuit 145. In a representative embodiment, slave security circuit 145 may be implemented similarly to master security circuit 120 discussed above. However, given that a slave device may be a less complex device, it is possible that as compared to master security circuit 120, slave security circuit 145 may be implemented as a more basic processing circuit or may be implemented as a programmable hardware device, such as may be implemented on a core or other processing engine of slave device such as processing circuit 143.

As further described herein, during a key exchange protocol, slave security circuit 145 itself also may generate a secure key, and send this key to slave controller 141 (as a transmit key (Tx) key). In turn, slave controller 141 may packetize this secure key (which as with the secure key discussed above may be in encrypted form). In turn, device $140_A$ communicates this key via a transmitter 144 of slave I/O circuit 148, along the data line of bus 130. As seen, after receipt in master I/O circuit 111, this secure key, in packetized form, is provided to host controller 110, where the secure key may be de-packetized and provided to master security circuit 120 as a receive (Rx) key. Note that in particular implementations as described herein, multiple encrypted communications may occur between master device 105 and slave device $140_A$.

Note further with regard to this key exchange protocol, the received key from device $140_A$ is provided from host controller 110 as the receive key (Rx key) to master security circuit 120. As described herein, master security circuit 120 may process this received key in order to determine whether it is valid, prior to enabling secure communication. When it is determined that the received key is valid, master security circuit 120 sends a secured message to host controller 110. In response to receipt of this secured message, host controller 110 may initiate secure communication with device $140_A$.

Assume further that while device $140_A$ is validated by way of a key exchange process as described herein, device $140_B$ is not validated as capable of secure communication, e.g., by inability to perform the key exchange or an unsuccessful conclusion to the key exchange protocol. In such case, it is possible to de-couple device $140_B$ from bus 130. To this end as illustrated in FIG. 2, a switch circuit 150 is coupled to bus 130. Note that while a single switch circuit is shown for ease of illustration, in embodiments a switch circuit may couple between each slave device 140 and bus 130, to intermediate access under control of host controller 110. More specifically, in embodiments master security circuit 120 may control switch circuit 150 to selectively couple/de-couple given devices 140 from bus 130 when secure communications are to occur as described herein. Understand while shown at this high level in the embodiment of FIG. 2, variations and alternatives are possible.

Figure 3A:
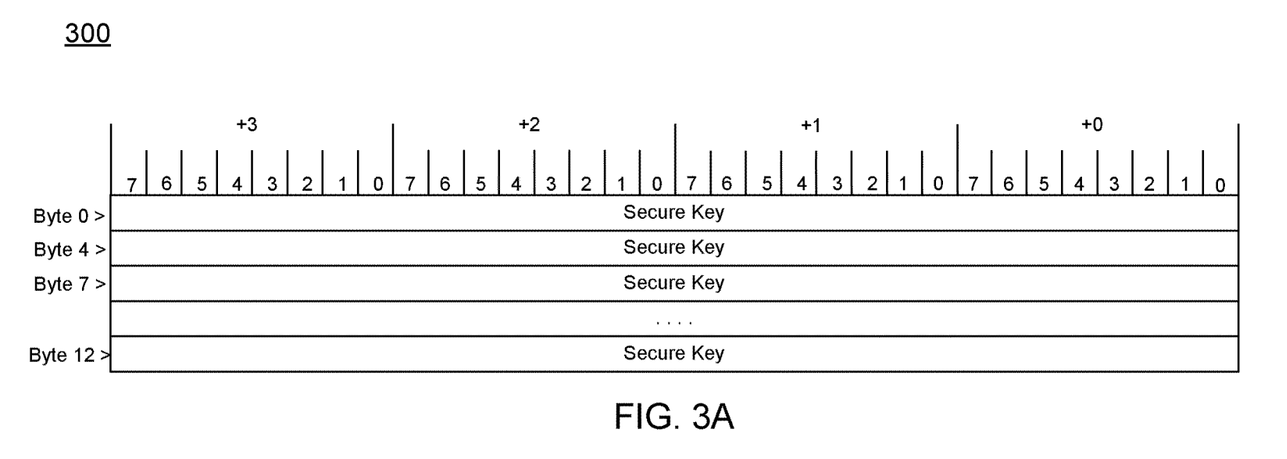
FIG. 3A is a block diagram of an arrangement of a secure key in accordance with an embodiment.

Referring now to FIG. 3A, shown is a block diagram of an arrangement of a secure key in accordance with an embodiment. A secure key 300 may be implemented as a multi-byte data structure. In different embodiments, a secure key can be 64-bits, 128-bits, 256-bits, or so forth. In the illustration of FIG. 3A a 128-bit secure key is shown. Note that the encrypted key may be encapsulated into I3C format data in different manners. For example, the key may be transformed by 16 data slicing into 16-bit format, or 32 data slicing into 8-bit format, e.g., depending on capabilities of requesting devices. As some examples, packet slicing may be of 128 or 256 bits, depending on communication protocol. For 128-bit keys, different schemes may occur, such as: 4 bytes with 4 slices; 2 bytes with 8 slices; or 1 byte with 16 slices. Similarly for a 256-bit key, schemes may include: 4 bytes with 8 slices; 2 bytes with 16 slices; or a single byte with 32 slices.

Figure 3B:
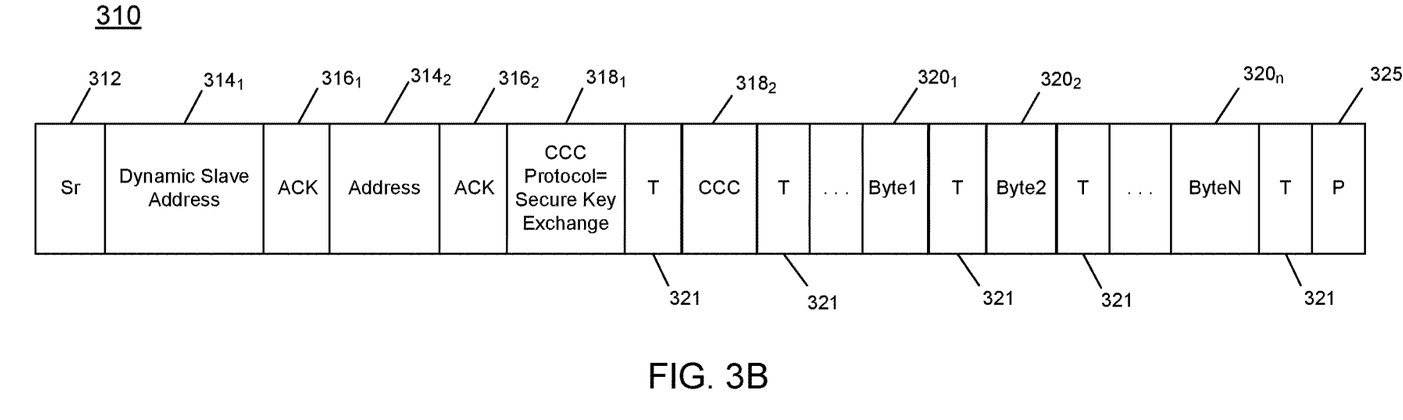
FIG. 3B is a representative illustration of a data packet including a secure key in accordance with an embodiment.

To enable communication by way of a packetized link such as an I3C bus as described herein, a host controller may packetize this secure key into a data packet. Referring now to FIG. 3B, shown is a representative illustration of a data packet including a secure key in accordance with an embodiment. In FIG. 3B, an I3C packet 310 is illustrated that includes various header information and a payload including a secure key. As illustrated, packet 310 includes a field for a start/repeater start indicator 312. Packet 310 further includes an address field $314_1$ to store an address. In an embodiment, this address may be a dynamic slave address. Packet 310 may further include multiple acknowledgement fields including acknowledgement fields $316_1$, $316_2$. Note that an additional address field $314_2$ is present. Common command code (CCC) protocol fields $318_1$-$318_2$ identify packet 310 as a secure key exchange packet and further provide information as to a length of the payload portion such as via a burst mode indication. Note that packet 310 further includes various transition bits 321, which may be used to implement packet slicing based on byte identifiers, e.g., 0-4 and also byte order, e.g., 0-12. Finally, data packet 310 includes a payload portion including a plurality of bytes $320_1$-$320_n$. The secure key may be included in bytes 320 of this payload portion. Note that following the completion of the payload, a final transition bit 321 is included, followed by a parity bit 325. Understand while shown with this particular format in FIG. 3B, various embodiments are possible.

Figure 4:
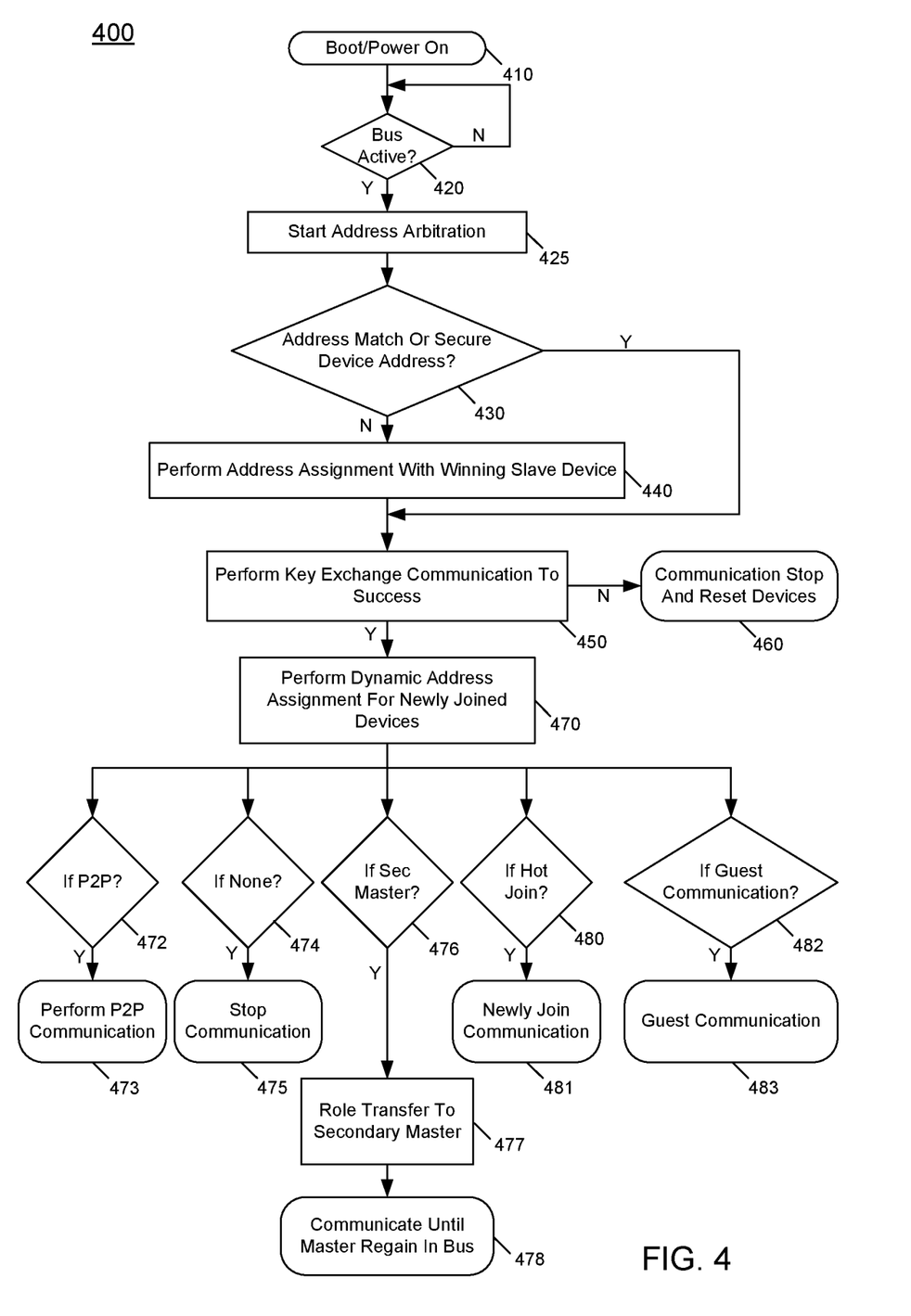
FIG. 4 is a flow diagram of a method in accordance with an embodiment of the present invention.

Referring now to FIG. 4, shown is a flow diagram of a method in accordance with an embodiment of the present invention. More specifically, method 400 is a method for performing a trusted communication via a bus in accordance with an embodiment. Such trusted communication may be used in various situations, including to enable a secondary master role transfer, a peer-to-peer (P2P) communication between two known devices and/or a hot join where a new device is dynamically coupled to the bus. Note that method 400 may be performed by a host controller. As such, method 400 may be performed by hardware circuitry, firmware, software and/or combinations thereof.

As illustrated, method 400 begins during boot/power on operation (block 410). Next it is determined at diamond 420 whether the bus is active, which may be determined via a wake event where the SCL line goes high and the SDA line goes low. If so, control passes to block 425 where an address arbitration may start. Next it is determined at diamond 430 whether an address match occurs with a given device or a known secure device address is found for a slave device. If this address match or known secure device address is found, control passes directly to block 450 to perform a key exchange communication, described further below.

Instead in the absence of such address matching, control passes to block 440 where an address assignment may be performed with a winning slave device, namely the slave device that wins the bus arbitration process. As such, this winning slave device then proceeds to perform the key exchange communication at block 450.

Note that a communication process herein may occur in the situation where a given bus agent issues a particular bus command related to situations calling for a key exchange protocol. In different embodiments, this detected bus command may be a request from a slave device or from the master device depending on whether a system engine is to communicate, or sensor data is available and seeks master attention for a peer-to-peer (P2P) role transfer or hot join situation. In one embodiment, for a P2P communication the slave address may be set to a predetermined P2P address and a read bit is set to a first value (e.g., 1). In an embodiment, for a role transfer the slave address may be set to a different predetermined address (e.g., a value of 2) the read bit set to the first value. In turn for a hot join operation the slave address may be set to another predetermined address (e.g., a value of 7h2) and a write bit may be set to the first value. For a guest protocol communication, the slave address may be set to a guest protocol device supported address.

At block 450 a secure key exchange communication process may be performed and completed to success. If this process is not successful, control passes to block 460 where communication between these devices stops and the devices are reset. In an embodiment in which the communicating device is an external device, a platform switch may be used to only stop those particular devices. Note in some instances, the secure key exchange communication process may proceed iteratively between a master device and multiple slaves/secondary masters, where multiple such devices are identified and have matching addresses, e.g., in situations where these devices have addresses corresponding to predetermined addresses, such as for the above-described particular bus operations (secondary master role transfer, P2P or hot join situations).

If it is determined that the secure key exchange communication was successful, control passes to block 470 where a dynamic address assignment may be performed for the newly joined device to provide a dynamic address to this device. Note that this dynamic address assignment may be for devices capable of performing dynamic addressing. In other instances, such as for legacy operation with an I²C device that has only a single static address, operation at block 470 does not occur. In the case that the key exchange protocol does not successfully complete, the master may terminate address assignment for such unsecure device. Note that as in FIG. 4, dynamic address assignment is performed only if the secure key exchange communication is completed successfully in that the two device keys match, otherwise communication stops. Once this key exchange communication completes successfully, then bus communication occurs according to address match condition.

Depending upon the type of communication (as determined at one of diamonds 472, 474, 476, 480 or 482), a particular communication (or communication stop occurs). Specifically, if it is determined that the requested communication is a P2P communication (determined at diamond 472), control passes to block 473 where the P2P communication may occur. Similarly if it is determined that there is to be no communication (determined at diamond 474), control passes to block 475 where communication may stop. If it is determined that the requested communication is from a secondary master to initiate a role transfer (determined at diamond 476), control passes to block 477 where the role transfer may be performed. Thereafter at block 478, the devices may communicate under control of the secondary master until the main master regains control.

Still with reference to FIG. 4, if it is determined that the requested communication is a hot join operation (determined at diamond 480), control passes to block 481 where communication may occur with the newly joined device. Finally, if it is determined that the requested communication is a guest protocol communication (determined at diamond 482), control passes to block 483 where communication of the guest protocol may occur on the bus. Note that in some embodiments this communication may be a sideband communication of the guest protocol. Understand while shown at this high level in the embodiment of FIG. 4, many variations and alternatives are possible.

Figure 5:
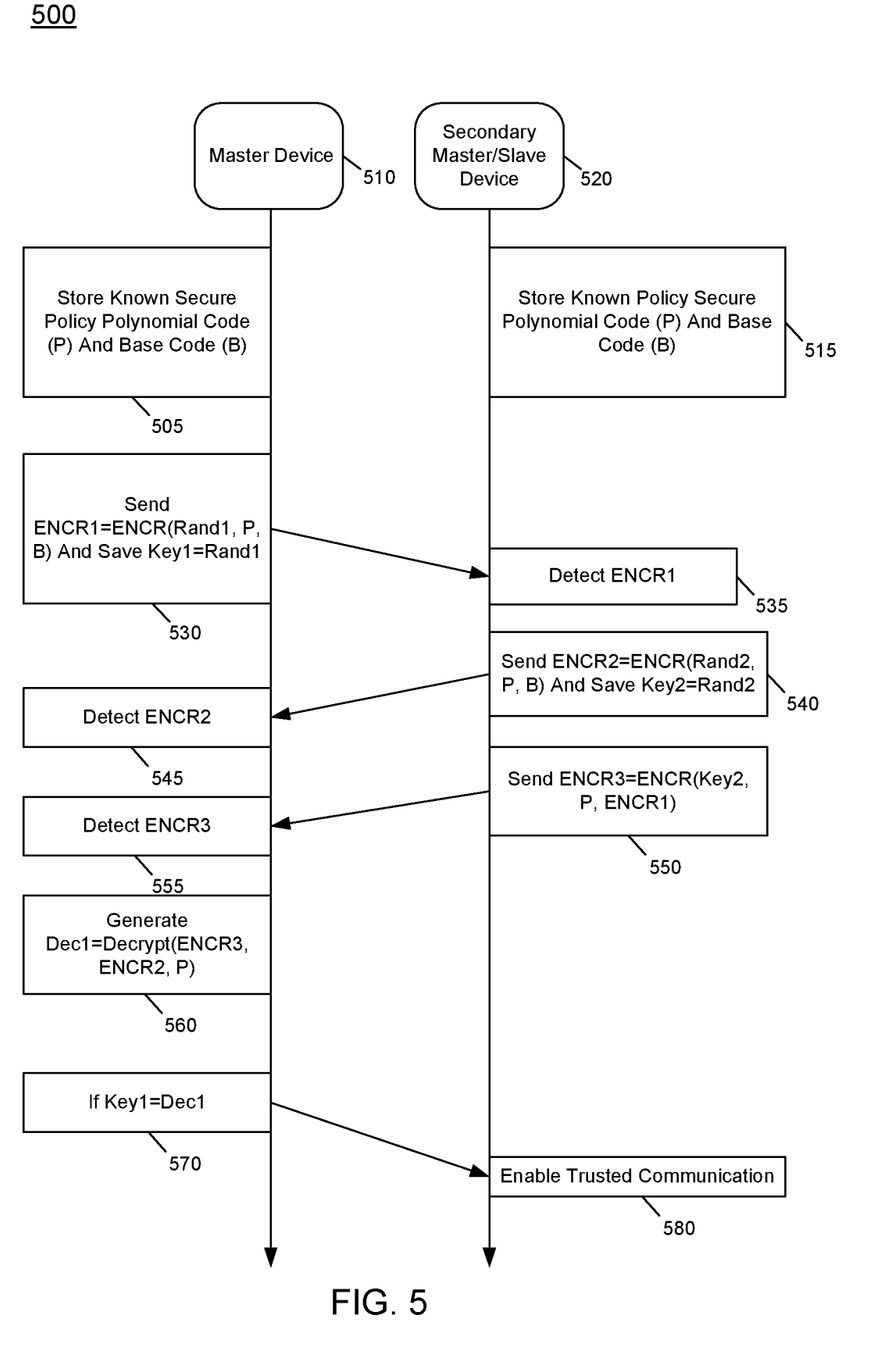
FIG. 5 is a flow diagram of a secure key exchange process in accordance with an embodiment of the present invention.

Referring now to FIG. 5, shown is a flow diagram of a secure key exchange process in accordance with an embodiment of the present invention. As shown in FIG. 5, this key exchange process may occur between a master device 510 and a second device 520, which in different embodiments may be a secondary master and/or slave device. As illustrated, the secure key exchange process begins, e.g., in response to a determination of a particular requested communication type between the devices. Note that prior to the key exchange process, e.g., upon boot (or in some cases during device manufacture), a predetermined polynomial code and base code may be provided to both devices (blocks 505 and 515). More specifically, a predetermined secure policy polynomial code (P) and a base code (B) may be stored within master device 510 and second device 520. That is, the same values for polynomial code (P) and base code (B) may be stored in both devices. Note that in instances where there are multiple devices that are to perform a key exchange protocol with a master device, separate pairs of (P) and (B) codes may be provided for each pairing of the master device with another device. Note that these codes may be included in firmware, such as basic input/output system (BIOS) code, which is stored into the devices upon boot. In yet other cases, these values may be provided by another security entity, such as dynamically when a key exchange protocol is to be performed between devices. In a still further case, master device 510 may include or obtain these codes and then provide them to second device 520.

In one embodiment, these codes may be stored in a secure storage of the respective devices. In some cases, these codes may be stored in a non-volatile storage of each device. In other cases, such as where these codes may be dynamically updated upon each boot or reset cycle, these codes can be stored in volatile memory. In one particular embodiment, the secure policy polynomial code (P) may be 8 or 16 bits depending on hardware complexity, and may be generally configured to include 8 bits or 16 bits. Similarly, base code (B) may be 4-5 bits or more.

As illustrated, a secure key exchange process may begin at block 530 where the master generates a random number (e.g., using random number functionality within a security processor). This random number (Rand1) may be stored in a given storage, e.g., of the security processor, as a first key (Key1). Thereafter the security processor may encrypt this value using the secure policy polynomial code and the base code (resulting in Encr1). In one embodiment, the encryption may be according to a given encryption technique such as an Advanced Encryption Standard (AES), Triple Data Encryption Standard (DES), Rivest Shamir Adleman (RSA), Blowfish, Twofish or any other encryption/decryption techniques.

Thereafter, master device 510 sends this encrypted key as a secure key to second device (block 530), which may detect and store this encrypted secure key (Encr1) (block 535). At block 540, second device 520 may perform a similar process to generate another random number (Rand2), save it as a key (Key2) and encrypt the key using the same secure policy polynomial code and base code, to obtain an encrypted value (Encr2). In turn, second device 520 sends the resulting encrypted key as a secure key to master device 510, which detects and stores this value at block 545.

At block 550, second device 520 generates another encrypted value, Encr3, which may be generated by encrypting its private key (Key2) using the policy secure polynomial code (P) and the (encrypted) secure key (Encr1) received from master device 510. Thereafter at block 555, master device 510 detects this encrypted value and stores it.

Finally, at block 560 master device 510 uses these two values received from second device 510 and the policy polynomial code to obtain the original random number generated in device 510. Next at block 570, master device 510 determines whether these values match. Specifically, master device 510 determines whether the resulting decrypted value (Dec1) matches the private key originally generated by master device 510 (namely Key1, which in turn corresponds to the original random number (Rand1)). If so, it is determined that second device 520 is to be trusted and accordingly at block 580, a trusted communication between the devices is enabled. Instead, if master device 510 does not identify a match between its original key (Key1) and the decrypted value received from second device 520, an indication of unauthorized access may be issued. For example, in an embodiment upon this determination, a host controller may send a message to a secure device and/or system engine, and/or to a host controller. Upon receiving indication of a successful completion, a host controller starts a communication where assignment or address arbitration or other communication may proceed.

In addition, when master device 510 determines that these two values do not match, no further communication between the devices may proceed. In some embodiments, the host controller may cause second device 520 to be de-coupled from the bus according to a given technique, as described herein. Using an embodiment, if during the transfer of secure keys via the multi-drop bus as described in FIG. 5, a non-trusted device snoops information regarding the exchanged key but does not have information of the original random numbers generated by the devices, the key information cannot be compromised.

Note that in certain embodiments, trusted communications may proceed using plaintext data. That is, after this key exchange process is successfully performed for at least a given boot cycle, master device 510 may trust second device 520 such that packet communications may occur unencrypted via the bus. Note that during this secure communication, untrusted devices can be identified and controlled to prevent snooping. For example, switches may be used to de-couple an untrusted device. Such switches may be controlled by either the host controller or through power management states. Another option is for the host controller to stop output of the clock signal while non-trusted devices are trying to snoop the bus. At a later time again, if no trusted communication stabilized, then the master device does not communicate. Understand while shown at this high level in the embodiment of FIG. 5, many variations and alternatives are possible.

Figure 6:
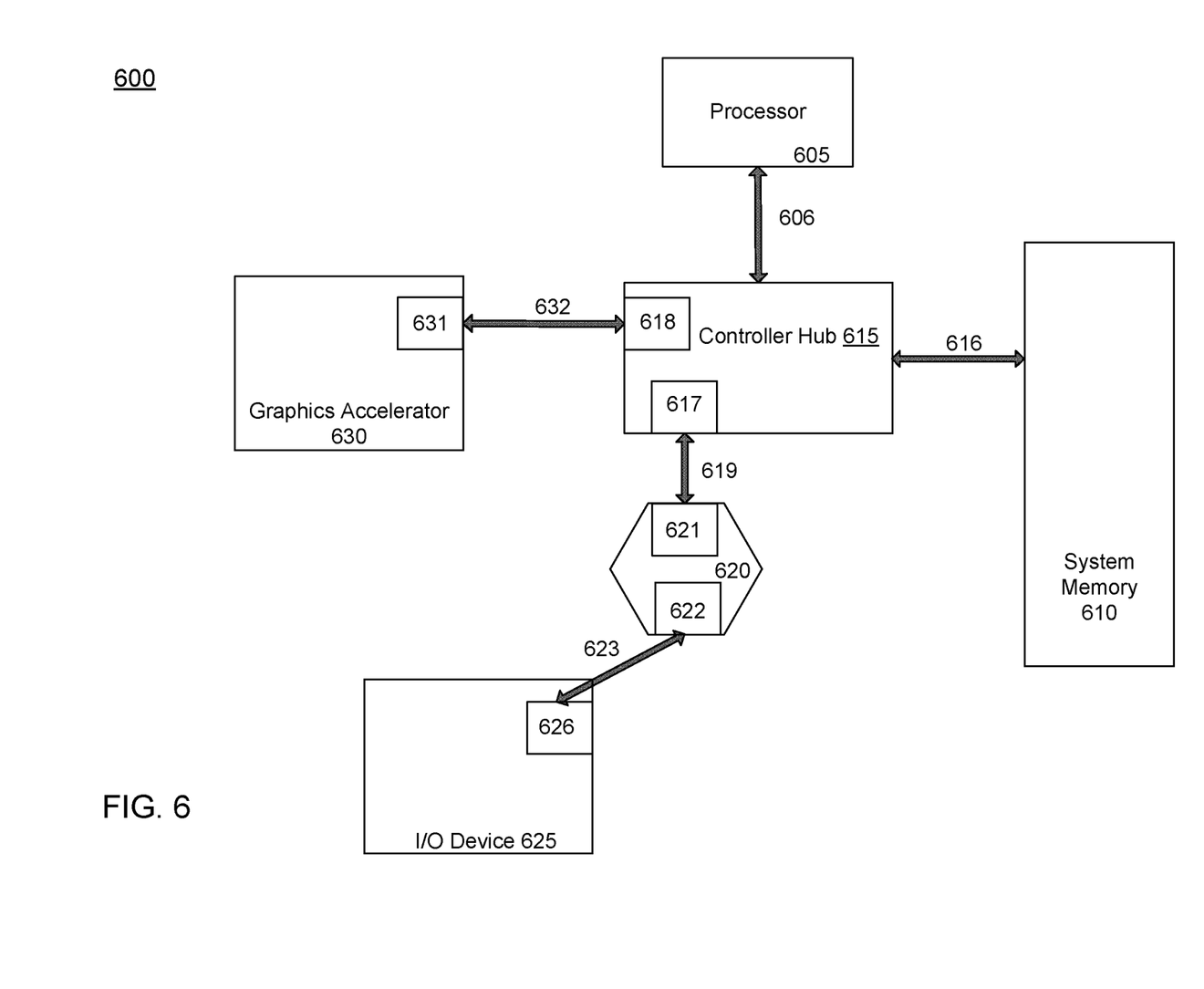
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect. In another embodiment, link 606 includes a multi-drop interconnect architecture that may be compliant with one or more different interconnect standards, and which may enable secure communications in response to a successful key exchange protocol, as described herein.

System memory 610 includes any memory device, such as random access memory (RAM), non-volatile (NV) memory, or other memory accessible by devices in system 600. System memory 610 is coupled to controller hub 615 through a memory link 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through controller hub 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example, and which may perform a secure key exchange to enable secure communications to occur via the bus, as described herein. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
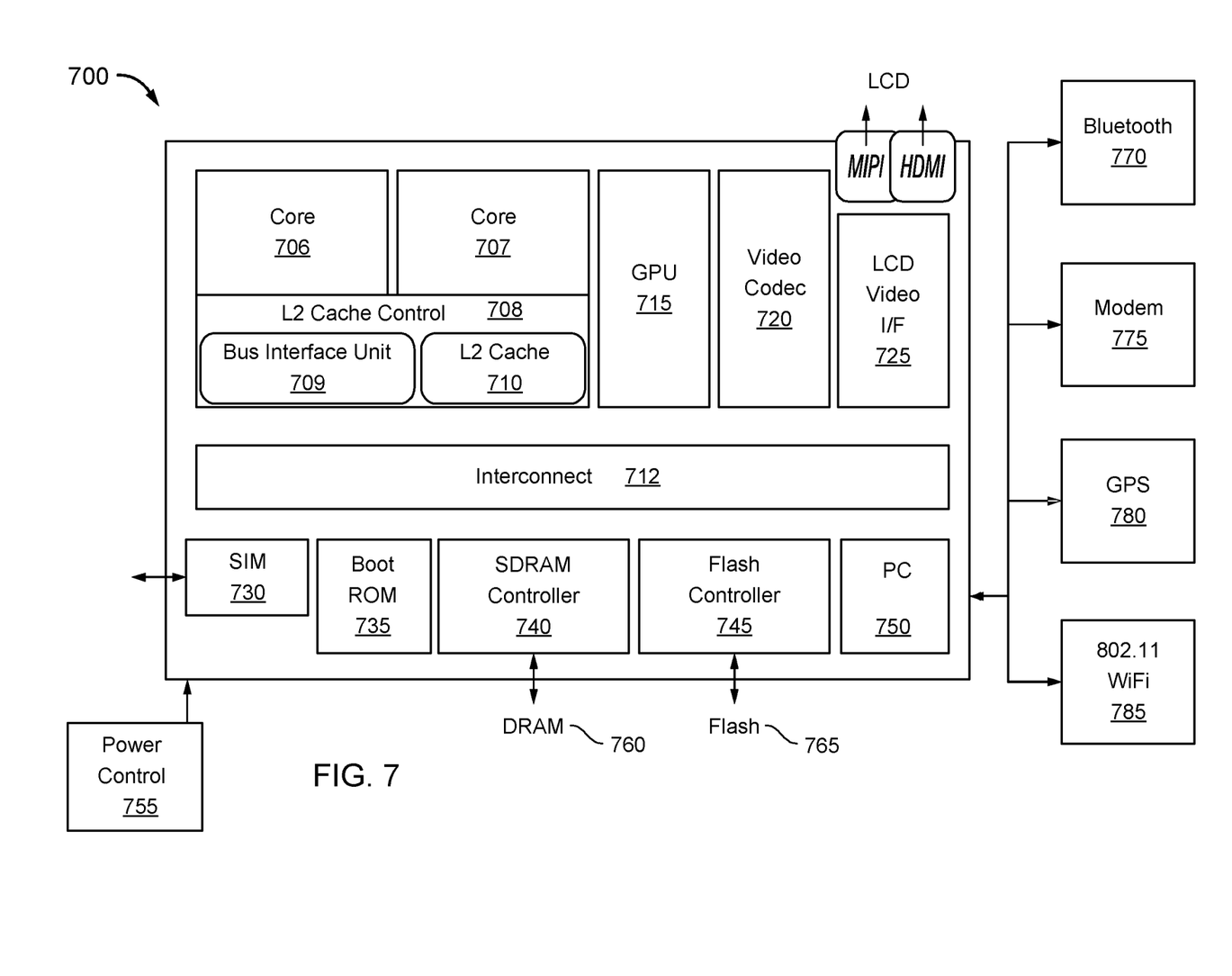
FIG. 7 is an embodiment of a system-on-chip design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an instruction set architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. Any of these interconnects/interfaces may incorporate aspects described herein, including the ability to perform a secure key exchange and thereafter enable secure communication in various communication modes, such as in the context of a role transfer, P2P communication and/or hot join, as described herein. In addition, the system illustrates peripherals for communication, such as a Bluetooth module 770, modem 775, GPS 780, and WiFi 785. Also included in the system is a power controller 755.

Figure 8:
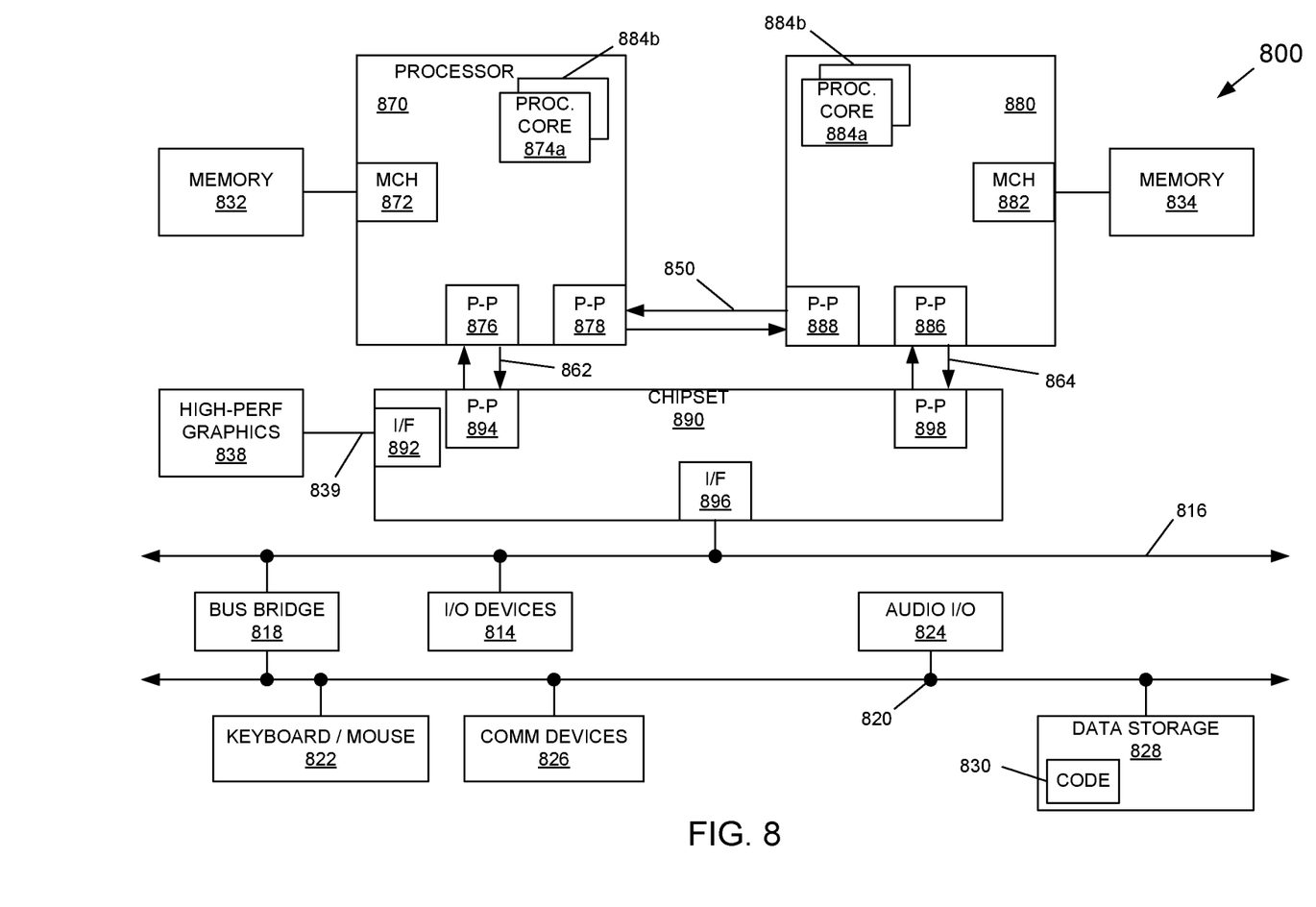
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Any of the devices shown in FIG. 8 may be configured to perform a secure key exchange process to identify one or more trusted devices and thereafter to enable secure communication to occur with such trusted devices, while at the same time, preventing snooping (e.g., by way of de-coupling) by one or more non-trusted devices, as described herein.

The following examples pertain to further embodiments.

In one example, an apparatus comprises a processing circuit to execute instructions and a host controller coupled to the processing circuit to perform a key exchange with a second device to couple to the apparatus via a bus to which a plurality of devices may be coupled. In response to a successful completion of the key exchange, the host controller is to enable secure communication with the second device.

In an example, the host controller is to prevent at least one other device of the plurality of devices from access to the bus during the secure communication.

In an example, the apparatus further comprises a security circuit coupled to the host controller to generate a first random number and encrypt the first random number using a first polynomial code and a second code to generate a first key comprising the encrypted first random number.

In an example, the key exchange comprises generation of the first key and transmission of the first key to the second device.

In an example, the key exchange further comprises: receipt of a second key comprising an encrypted second random number from the second device; receipt of a third encrypted value from the second device; and decryption of the third encrypted value using the encrypted second random number and the first polynomial code.

In an example, the key exchange is to successfully complete in response to the decrypted third encrypted value matching the first random number.

In an example, the apparatus further comprises a storage to store the first polynomial code and the second code, where the second device further comprises a second storage to store the first polynomial code and the second code.

In an example, the storage is further to store a second polynomial code and a third code to enable the host controller to perform a second key exchange with a third device of the plurality of devices.

In an example, the host controller is to encapsulate the first key into a first packet including a header portion and a payload portion, the payload portion including the first key.

In an example, the host controller is to prevent the secure communication on the bus between the apparatus and the second device in response to an unsuccessful completion of the key exchange.

In an example, the secure communication comprises a transfer of a master role from the apparatus to the second device, the apparatus comprising a master device and the second device comprising a secondary master device.

In an example, the host controller is to dynamically assign an address to the second device in response to the successful completion of the key exchange, to enable the secure communication to occur.

In another example, a method comprises: in response to a request received in a first device coupled to a second device via a bus, generating, in the first device, a first key and encrypting the first key using a first polynomial code and a second code; sending the encrypted first key to the second device via the bus; receiving, in the first device, a second encrypted key from the second device and receiving a third encrypted value from the second device; decrypting, in the first device, the third encrypted value using the second encrypted key and the first polynomial code; determining whether the decrypted third encrypted value matches the first key; and in response to determining that the third encrypted value matches the first key, enabling a secure communication between the first device and the second device via the bus.

In an example, the method further comprises causing one or more other devices to be de-coupled from the bus during the secure communication.

In an example, causing the one or more devices to be de-coupled from the bus comprises causing one or more switches to be disabled to prevent the one or more other devices from accessing the bus.

In an example, the method further comprises detecting at least one non-trusted device coupled to the bus, and in response to detecting the at least one non-trusted device, preventing a clock signal from being communicated on the bus.

In an example, the secure communication via the bus comprises a communication of a guest protocol.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes a processor having: at least one processing circuit to execute instructions; a host controller to control communication on an interconnect to which a plurality of devices are coupled; and an I/O circuit to communicate information via the interconnect, where the host controller is, in response to a request from a first device of the plurality of devices, to perform a key exchange with the first device using a first code and a second code, the first code and the second code common to the processor and the first device, and in response to a successful completion of the key exchange, enable secure communication with the first device. The system may further include the first device coupled to the processor via the interconnect and a second device coupled to the processor via the interconnect, where during the secure communication, the host controller is to prevent the second device from access to the interconnect.

In an example, the processor further comprises a trusted execution environment comprising a security circuit coupled to the host controller to generate, in response to a key generation request from the host controller, a first random number and encrypt the first random number using the first code and the second code to generate a first key comprising the encrypted first random number, the host controller to send the encrypted first random number to the first device.

In an example, the security circuit is to: receive an encrypted second random number from the first device and receive an encrypted third value from the first device; decrypt the encrypted third value using the encrypted second random number and the first code; and send to the host controller an indication of the successful completion of the key exchange if the decrypted third value matches the first random number, where the host controller is to enable the secure communication in response to the indication of the successful completion.

In a still further example, an apparatus comprises: means for performing a key exchange with a second device to couple to the apparatus via a bus to which a plurality of devices may be coupled; and means for enabling secure communication with the second device, in response to a successful completion of the key exchange.

In an example, the apparatus further comprises means for preventing at least one other device of the plurality of devices from access to the bus during the secure communication.

In an example, the apparatus further comprises security means for generating a first random number and encrypting the first random number using a first polynomial code and a second code to generate a first key comprising the encrypted first random number.

In an example, the apparatus further comprises means for transmitting the first key to the second device.

In an example, the apparatus further comprises means for receiving a second key comprising an encrypted second random number and a third encrypted value from the second device.

In an example, the apparatus further comprises means for decrypting the third encrypted value using the encrypted second random number and the first polynomial code.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a processing circuit to execute instructions;
   a security circuit coupled to the processing circuit to generate a first key and encrypt the first key using a predetermined first code and a predetermined second code to generate an encrypted first key; and
   a host controller coupled to the security circuit to perform a key exchange of the encrypted first key of the host controller and an encrypted second key of a second device with the second device to couple to the apparatus via a bus to which a plurality of devices may be coupled, and in response to a successful completion of the key exchange, enable secure communication with the second device, wherein the encrypted second key is based on a second key generated by the second device and encrypted by the second device using the first predetermined code and the second predetermined code.

2. The apparatus of claim 1, wherein the host controller is to prevent at least one other device of the plurality of devices from access to the bus during the secure communication.

3. The apparatus of claim 1, wherein the security circuit is to generate a first random number as the first key and encrypt the first random number using the predetermined first code and the predetermined second code to generate the encrypted first key, the predetermined first code comprising a first polynomial code.

4. The apparatus of claim 3, wherein the key exchange comprises transmission of the encrypted first key to the second device.

5. The apparatus of claim 4, wherein the key exchange further comprises:
   receipt of the encrypted second key from the second device, the second key comprising a second random number;
   receipt of a third encrypted value from the second device; and
   decryption of the third encrypted value using the second random number and the first polynomial code.

6. The apparatus of claim 5, wherein the key exchange is to successfully complete in response to the decrypted third encrypted value matching the first random number.

7. The apparatus of claim 3, further comprising a storage to store the first polynomial code and the predetermined second code, wherein the second device further comprises a second storage to store the first polynomial code and the predetermined second code.

8. The apparatus of claim 7, wherein the storage is further to store a second polynomial code and a third code to enable the host controller to perform a second key exchange with a third device of the plurality of devices.

9. The apparatus of claim 3, wherein the host controller is to encapsulate the first key into a first packet including a header portion and a payload portion, the payload portion including the first key.

10. The apparatus of claim 1, wherein the host controller is to prevent the secure communication on the bus between the apparatus and the second device in response to an unsuccessful completion of the key exchange.

11. The apparatus of claim 1, wherein the secure communication comprises a transfer of a master role from the apparatus to the second device, the apparatus comprising a master device and the second device comprising a secondary master device.

12. The apparatus of claim 1, wherein the host controller is to dynamically assign an address to the second device in response to the successful completion of the key exchange, to enable the secure communication to occur.

13. A non-transitory machine-readable medium having stored thereon instructions, which if performed by a machine cause the machine to perform a method comprising:
- in response to a request received in a first device coupled to a second device via a bus, generating, in the first device, a first key and encrypting the first key using a predetermined first polynomial code and a predetermined second code;
- sending the encrypted first key to the second device via the bus;
- receiving, in the first device, a second encrypted key from the second device and receiving a third encrypted value from the second device, the second encrypted key being based on a second key generated by the second device and encrypted by the second device using the predetermined first polynomial code and the predetermined second code;
- decrypting, in the first device, the third encrypted value using the second encrypted key and the predetermined first polynomial code;
- determining whether the decrypted third encrypted value matches the first key; and
- in response to determining that the third encrypted value matches the first key, enabling a secure communication between the first device and the second device via the bus.

14. The non-transitory machine-readable medium of claim 13, wherein the method further comprises causing one or more other devices to be de-coupled from the bus during the secure communication.

15. The non-transitory machine-readable medium of claim 14, wherein causing the one or more devices to be de-coupled from the bus comprises causing one or more switches to be disabled to prevent the one or more other devices from accessing the bus.

16. The non-transitory machine-readable medium of claim 13, wherein the method further comprises detecting at least one non-trusted device coupled to the bus, and in response to detecting the at least one non-trusted device, preventing a clock signal from being communicated on the bus.

17. The non-transitory machine-readable medium of claim 13, wherein the secure communication via the bus comprises a communication of a guest protocol.

18. A system comprising:
a processor having:
- at least one processing circuit to execute instructions;
- a host controller to control communication on an interconnect to which a plurality of devices are coupled; and
- an input/output (I/O) circuit to communicate information via the interconnect, wherein the host controller is, in response to a request from a first device of the plurality of devices, to perform a key exchange with the first device using a first key of the processor encrypted using a predetermined first code and a predetermined second code and receive a second key of the first device encrypted using the predetermined first code and the predetermined second code, the predetermined first code and the predetermined second code common to the processor and the first device, and in response to a successful completion of the key exchange, enable secure communication with the first device;

the first device coupled to the processor via the interconnect; and
a second device coupled to the processor via the interconnect, wherein during the secure communication, the host controller is to prevent the second device from access to the interconnect.

19. The system of claim 18, wherein the processor further comprises a trusted execution environment comprising a security circuit coupled to the host controller to generate, in response to a key generation request from the host controller, a first random number and encrypt the first random number using the predetermined first code and the predetermined second code to generate the first encrypted key comprising the encrypted first random number, the host controller to send the encrypted first random number to the first device.

20. The system of claim 19, wherein the security circuit is to:
- receive an encrypted second random number from the first device and receive an encrypted third value from the first device, wherein the encrypted second key comprises the encrypted second random number;
- decrypt the encrypted third value using the encrypted second random number and the predetermined first code; and
- send to the host controller an indication of the successful completion of the key exchange if the decrypted third value matches the first random number, wherein the host controller is to enable the secure communication in response to the indication of the successful completion.

* * * * *